US005208520A

United States Patent [19]

Sawato et al.

[11] Patent Number: 5,208,520

[45] Date of Patent: May 4, 1993

[54] PEDAL ASSEMBLY IN SEWING MACHINE WITH POTENTIOMETER CONTROL DEVICE

[75] Inventors: Tatsuya Sawato; Hiroshi Yamada; Keiichi Takikoshi, all of Aichi, Japan

[73] Assignee: Mitsubishi Denki K.K., Tokyo, Japan

[21] Appl. No.: 820,982

[22] Filed: Jan. 15, 1992

[30] Foreign Application Priority Data

Jan. 24, 1991 [JP] Japan .......................... 3-001817[U]

[51] Int. Cl.[5] .......................................... H02P 7/00

[52] U.S. Cl. .............................. 318/551; 388/838; 74/512

[58] Field of Search ............... 318/551; 388/824, 827, 388/837, 838, 840, 860; 74/512, 560, 561, 515 R, 515 E, 562, 562.5, 564, 566, 478, 478.5

[56] References Cited

U.S. PATENT DOCUMENTS

| | | | |
|---|---|---|---|
| 3,648,142 | 3/1972 | Corey et al. | 388/838 |
| 4,299,182 | 11/1981 | Tanaka | 318/551 X |
| 4,310,788 | 1/1982 | Hanyu et al. | 318/551 |
| 4,388,508 | 6/1983 | Wilson | 74/512 X |
| 4,888,997 | 12/1989 | Eckert et al. | 74/512 X |
| 4,965,417 | 10/1990 | Massie | 74/560 X |
| 5,067,368 | 11/1991 | Itakura et al. | 74/560 |

FOREIGN PATENT DOCUMENTS 63-49270 12/1988 Japan .

*Primary Examiner*—Jonathan Wysocki
*Attorney, Agent, or Firm*—Sughrue, Mion, Zinn, Macpeak & Seas

[57] ABSTRACT

In the pedal assembly of a sewing machine drive device, a potentiometer operating member is guided by a mounting stand secured to the pedal stand, to control the slide shaft of a direct acting type potentiometer, and a speed changing pedal including a depressing board to depress the potentiometer operating member with its one end portion is coupled to the pedal stand with the other end portion. When the speed changing pedal is stepped on, a signal is outputted to change the speed of rotation of the sewing machine according the movement of the pedal thus stepped on. The pedal stand may have an opening with which the pedal is swingably engaged. In addition, signal pedals may be arranged in alignment with the speed changing pedal with the same mounting means provided at the position of those pedals, so as to allow the pedals to swap in position with one another.

6 Claims, 6 Drawing Sheets

PEDAL ASSEMBLY IN SEWING MACHINE WITH POTENTIOMETER CONTROL DEVICE

BACKGROUND OF THE INVENTION

This invention relates to the pedal assembly of a sewing machine drive device which is used when a person operates a sewing machine while standing.

FIGS. 9 through 11 show one example of a conventional pedal assembly of this type, disclosed, for instance, by Japanese Utility Patent Application Publication No. 49270/1988. More specifically, FIGS. 9 and 10 are a front view and a left side view of the pedal unit, respectively, and FIG. 11 is a sectional view taken along line II—II in FIG. 9. In those figures, reference numeral 80 designates a lever unit. The lever unit 80 is made up of a photo-sensor for starting and stopping a sewing machine, a Hall device for providing a rotation speed instruction for the sewing machine, a magnet for operating the Hall device, a lever 88 for operating the shield plate of the photo-sensor, a spring urging the lever 88 upwardly at all times, and a frame supporting those components. The lever unit 80 is held in a casing 82 together with a printed circuit board on which a circuit for processing the output signal of the Hall device is formed. The casing 82 is fixedly mounted on a casing mounting board 100 which is a lateral member reinforcing the lower end portions of the legs of a sewing machine table. The casing mounting board 100 is secured to a pedal mounting stand 42 with bolts 84. The casing 82 has a lid 130. The lever 88 is provided with a coupling rod 86. More specifically, the coupling rod 86 is used to couple the lever 88 to a pedal 90 through a ball joint 122. The pedal 90 is secured to a pedal stand 92 with a hinge 94. The pedal assembly further comprises a pedal stand mounting board 96 which has its upper end portion secured to the casing mounting board 100, and its lower end portion secured to the pedal stand 92 with screws 102. A cord 104 is extended from the lever unit 80, and connected to a control board (not shown). A foot switch pedal 106 (for providing a thread cutting signal for instance) is secured to the pedal stand 92 through a hinge 94. Another foot switch pedal 110 (for providing a presser bar lifting signal when a material to be sewed is turned, set or removed, for instance) is fixedly mounted on a foot switch pedal stand 112. Pedal stand coupling boards 114 are provided on both sides of the foot switch pedal stand 112. More specifically, the pedal coupling boards are secured to the pedal stand 92 with screws 116 at several points. Several screw holes are additionally formed on both sides of the pedal stand 112, so that another foot switch pedal stand 112 can be provided as indicated by the dotted line in FIG. 9 when necessary.

The conventional pedal assembly is constructed as described above. Upon stepping on the pedal 90, the lever 88 is pulled downwardly through the coupling rode 86 until it strikes against the stopper 120. In this operation, the lever unit 80 produces a rotation speed instruction for the sewing machine in correspondence to the amount of movement of the lever 88. The rotation speed instruction thus produced is applied to the control board (not shown) through the cord 104.

As was described above, in the conventional pedal assembly the lever unit 80 and the pedal section are provided separately. Therefore, in order to set the pedal assembly below the sewing machine table, it is necessary to fixedly secure the casing 82 accommodating the lever unit 80 on the pedal mounting stand 42. Thus, the installation of the pedal assembly is rather troublesome.

Furthermore, in the conventional pedal assembly, the Hall device is employed to output the rotation speed instruction for the sewing machine. Accordingly, the pedal assembly needs a printed circuit board on which a circuit for processing the output signal of the Hall device is formed, and the lever 88. Hence, the pedal assembly itself is unavoidably bulky, and relatively large in the number of components, and accordingly high in manufacturing cost.

In the conventional pedal assembly, the pedal 90 is secured to the pedal stand 92 with the hinge 94. Therefore, the pedal 90 cannot be readily removed from the pedal stand 92, for instance, for maintenance.

Sometimes it is necessary to shift the pedal depending on whether the operator is right-handed or whether he is left-handed. That is, sometimes the right-handed person may want to be on the left side of the pedal assembly to operate the pedals 90, 106 and 110 with his right foot, whereas the left-handed person may want to be on the right side of the pedal assembly to operate those pedals with his left foot. In order to operate the sewing machine with high efficiency, the pedal 90 for providing the rotation speed instruction should be set near the operator, because it is frequently operated during sewing. In FIG. 9, the pedal is so arranged as to be convenient for a right-handed person. However, in the case of the conventional pedal assembly, it is rather difficult to shift the pedal because of the above-described construction.

SUMMARY OF THE INVENTION

Accordingly, an object of this invention is to eliminate the above-described difficulties accompanying a conventional pedal assembly in a sewing machine drive device.

More specifically, an object of the invention is to provide a pedal assembly in a sewing machine drive device, which, in compared with a conventional pedal assembly, is simple in construction, small in size and small in the number of component, and can be installed with ease and manufactured at low cost.

Another object of the invention is to provide a pedal assembly in a sewing machine drive device in which the speed changing pedal and the signal pedal can be installed and removed with ease, and which is simple in maintenance and low in manufacturing cost.

A further object of the invention is to provide a pedal assembly in a sewing machine drive device in which the positions of the speed changing pedal and the signal pedal can be selected freely.

The foregoing objects and other objects of the invention have been achieved typically by the provision of a pedal assembly in a sewing machine drive device which, according to the invention, comprises: a pedal stand; a mounting stand secured to the pedal stand; a direct acting type potentiometer secured to the mounting stand; a potentiometer operating member which is guided and held by the mounting stand, to control the slide shaft of the direct acting type potentiometer; and a speed changing pedal including a depressing board adapted to depress the potentiometer operating member with one end portion thereof, the depressing board being swingably coupled to the pedal stand with the other end portion, the speed changing pedal being stepped on to output a signal for changing the speed of rotation of a sewing machine in accordance with an amount of movement of the speed changing pedal thus stepped on.

The pedal assembly may be so modified that it comprises: a pedal; and a pedal stand on which the pedal is mounted, and that the pedal has one end portion which is formed into a Z-shaped bent portion, and the pedal stand includes a pedal mounting portion in which a hole is formed into which the bent portion of the pedal is inserted, and in which a pedal accommodating space is formed in such a manner that, when the bent portion of the pedal is inserted into the hole, the pedal can swing about the line of contact where the folding line of the bent portion of the pedal meets the edge of the hole. The pedal being connected to the pedal stand by inserting the bent portion of the pedal into the hole and pedal accommodating space of the pedal stand.

Furthermore, provided according to another aspect of the invention is a pedal assembly in a sewing machine drive device which comprises: a pedal stand; a plurality of mounting stands secured to the pedal stand; a direct acting type potentiometer secured to the mounting stand; a potentiometer operating member which is guided and held by the mounting stand, to control the slide shaft of the direct acting type potentiometer; a speed changing pedal including a depressing board adapted to depress the potentiometer operating member with one end portion thereof, the depressing board being swingably coupled to the pedal stand with the other end portion; and signal pedals positioned in alignment with the speed changing pedal, the mounting stands having mounting means which are provided at the positions of the speed changing pedal and signal pedals, respectively.

The nature, utility and principle of the invention will be more clearly understood from the following detailed description when read in conjunction with the accompanying drawings.

DETAILED DESCRIPTION OF THE INVENTION

Figure 1:
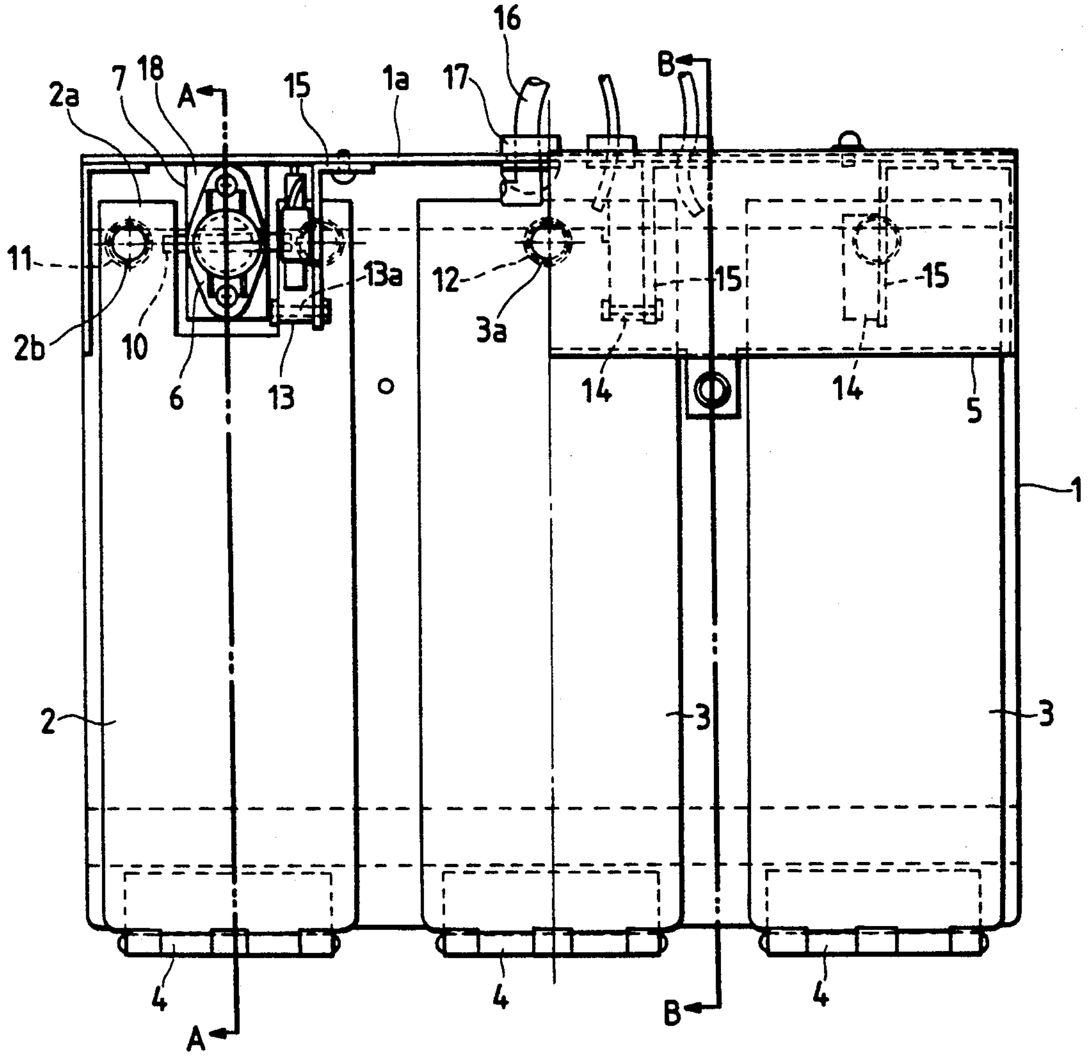
FIG. 1 is a plan view showing an example of a pedal assembly in a sewing machine drive device which constitutes a first embodiment of this invention.
Figure 2:
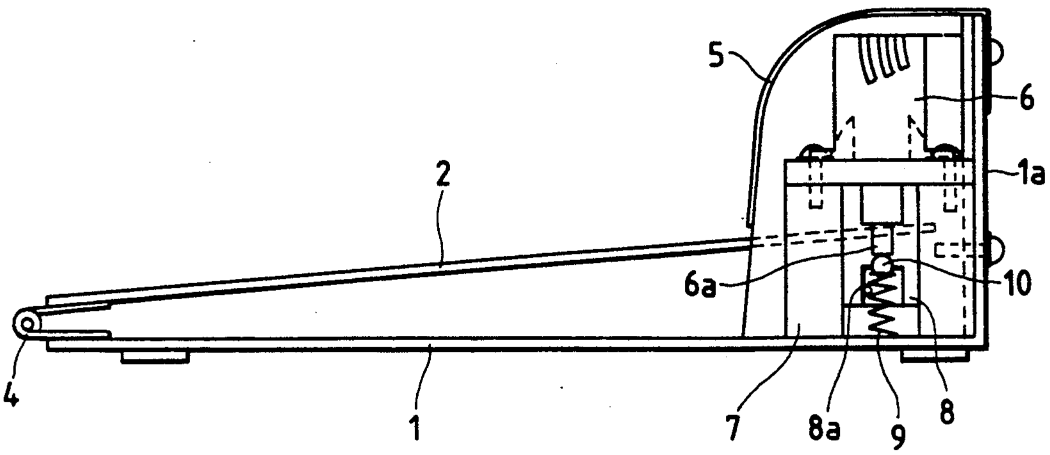
FIG. 2 is a sectional view showing a speed changing pedal section in the pedal assembly shown in FIG. 1.
Figure 3:
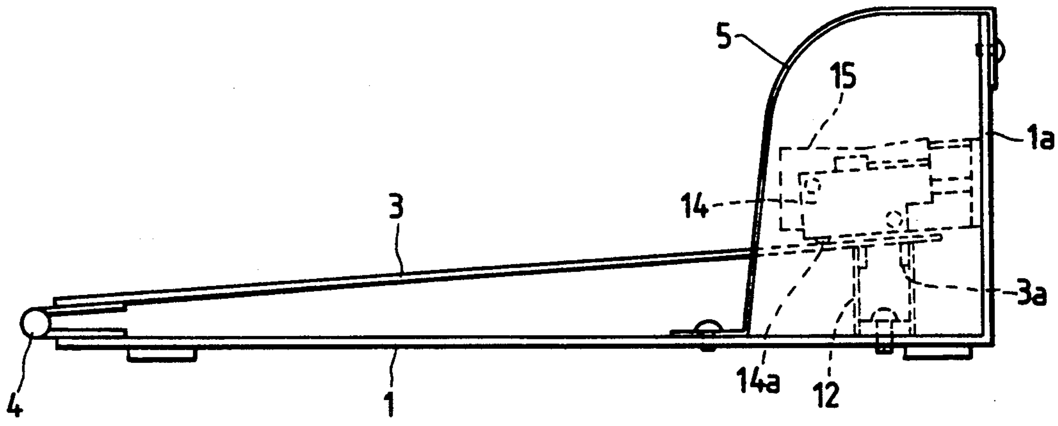
FIG. 3 is a sectional view showing a signal pedal section in the pedal assembly shown in FIG. 1.

Preferred embodiments of this invention will be described with reference to the accompanying drawings.

First Embodiment

An example of a pedal assembly in a sewing machine drive device, which constitutes a first embodiment of the invention, will be described with reference to FIGS. 1 through 4.

In FIGS. 1 through 4, reference numeral 1 designates a pedal stand; 2, a speed changing pedal secured through a hinge 4 to the pedal stand 1; 5, a cover secured to the pedal stand 1; and 6, a direct acting type potentiometer which forms a speed changing signal outputting unit together with a mounting stand 7, a guide 8, a coil spring 9 and a horizontal rod 10. The direct acting type potentiometer 6 is mounted on the mounting stand 7, which is secured to the rising portion 1*a* of the pedal stand 1.

Figure 4:
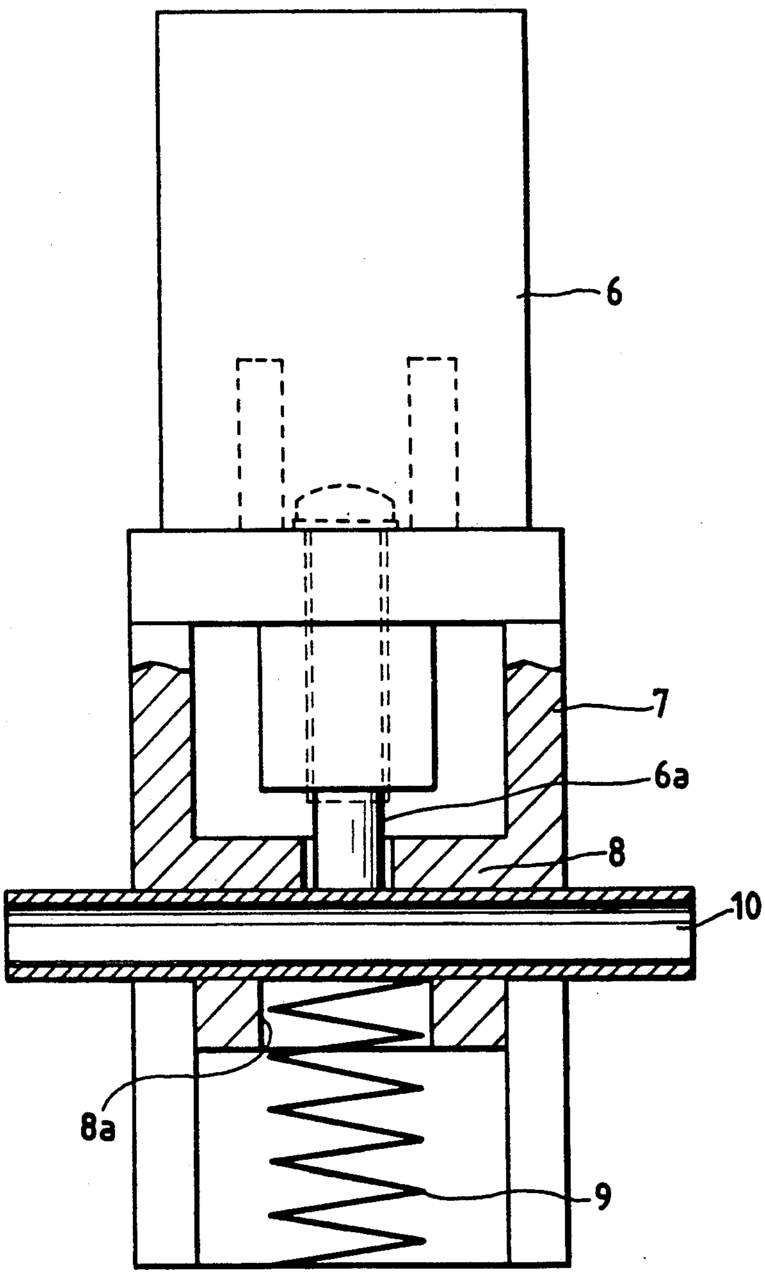
FIG. 4 is a sectional view showing a speed changing signal outputting unit in the pedal assembly shown in FIG. 1.

The direct acting type potentiometer 6 comprises: a casing of synthetic resin, a linear conductor accommodated in the casing; a brush sliding on the linear conductor, a slide shaft 6*a* of synthetic resin which holds the brush in such a manner that the brush is slidable on the linear conductor; a spring urging the slide shaft 6*a* downwardly at all times as shown in FIG. 4; and output signal lines.

The guide 8 is slidably fitted in the mounting stand 7. The guide 8 includes a holding portion 8*a* formed in it, in which the coil spring 9 is fitted to urge the guide 8 upwardly at all times. The horizontal rod 10 is fixedly secured to the guide 8, or the horizontal rod 10 and the guide 8 are formed as one unit. That is, the horizontal rod 10 and the guide 8 form a potentiometer operating member. The horizontal rod 10 confronts with the pressing portion 2*a* of the speed changing pedal. A holding part 2*b* is formed on the pressing portion 2*a* of the speed changing pedal 2. A coil spring 11 is connected between the holding part 2*b* and the pedal stand 1, to urge the speed changing pedal 2 upwardly at all times. The horizontal rod 10 serves as a stopper for the slide shaft 6*a* of the potentiometer 6, thus preventing the potentiometer 6 from being damaged by the upward motion of the slide shaft 6*a* due to the elastic force of the coil spring 11. The pedal assembly further comprises signal pedals 3. Each of the signal pedals is secured through a hinge 4 to the pedal stand 1. The signal pedal is urged upwardly at all times by a coil spring 12 which is interposed between the pedal stand 1 and a holding part 3*a* formed on the front end portion of the signal pedal. As shown in best in FIG. 1, reference numerals 13 and 14 designate micro-switches which are mounted on L-shaped mounting boards 15, respectively. The contact means 13*a* and 14*a* of the micro-switches 13 and 14 are faced downwardly; that is, they are held closed being pushed upwardly by the front end portions of the speed changing pedal 2 and of the signal pedal 3, respectively. The lower end face of the mounting boards 15 serve as stoppers for the respective pedals, thus protecting the micro-switches from damage. A lead wire 16 is fixedly secured to the rising portion of the pedal stand 1 with a bushing 17.

The operation of the pedal assembly thus constructed will be described.

Upon stepping on the speed changing pedal, the contact means 13*a* of the micro-switch 13 is opened, to output a sewing machine start signal. At the same time, the horizontal rod 10 secured to the guide 8 is pushed downwardly, thus urging the slide shaft 6a of the direct acting type potentiometer downwardly. The speed changing pedal can be depressed until the guide 8 abuts against the pedal stand 8. In this operation, the direct acting type potentiometer 6 produces a rotation speed instruction output corresponding to the amount of movement of the speed changing pedal 1 thus depressed. The output thus produced is applied through the lead wire 16 to the control board (not shown). On the other hand, when the signal pedals 3 are depressed, the contact means 14a of the micro-switches 14 are opened, thus providing, for instance, a thread cutting signal and a presser bar lifting signal, which are applied to the control board (not shown) through the lead wire 16.

Second Embodiment

Figure 5:
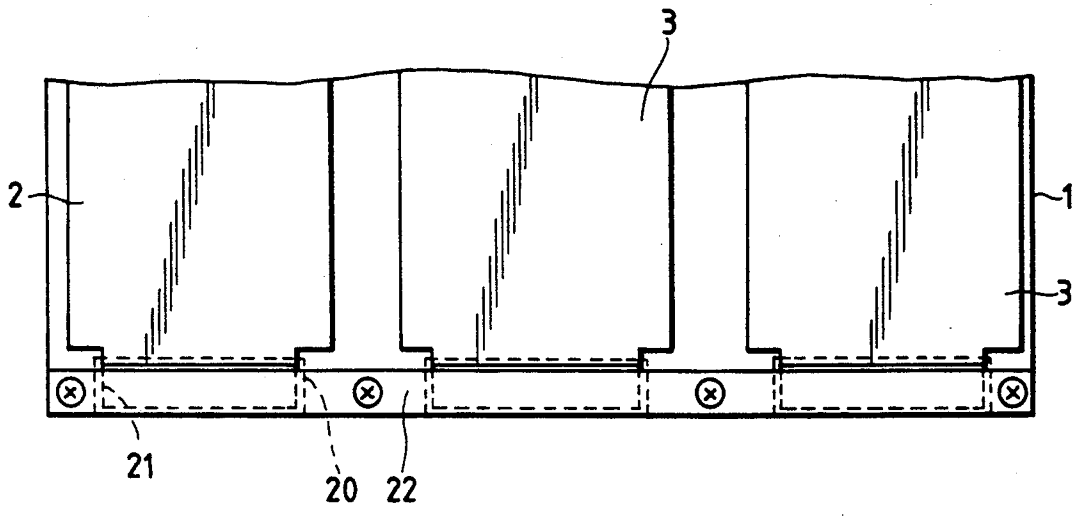
FIG. 5 is a plan view showing a pedal mounting section in another example of the pedal assembly which constitutes a second embodiment of the invention.
Figure 6:
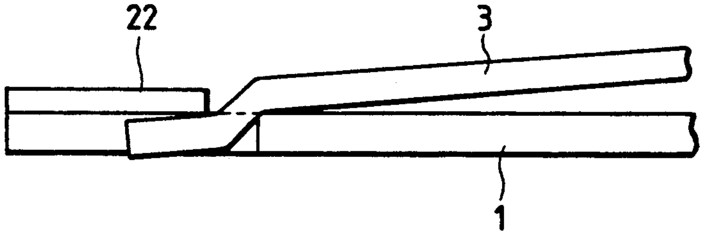
FIG. 6 is a sectional view showing a pedal mounting section in the pedal assembly shown in FIG. 5.

FIGS. 5 and 6 show another example of the pedal assembly which constitutes a second embodiment of the invention. The second embodiment is different from the first embodiment in the connection of the end portions of the speed changing pedal and the signal pedals 3. The pedal stand 1 has openings (or pedal accommodating spaces) 20 in the end portion. The end portions of the speed changing pedal 2 and the signal pedals 3 are each formed into a Z-shaped bent portion 21 as shown in FIG. 6. The Z-shaped bent portions 21 are inserted into the openings 20, and a retaining plate 22 is placed over the Z-shaped bent portions 21 of the pedals, so that the pedals are coupled to the pedal stand.

The technical concept of the second embodiment resides in that the end portions of the pedals 2 and 3 are formed into the Z-shaped bent portions 21, and for each of the pedals 2 and 3, a hole is formed in the pedal stand 1 into which the Z-shaped bent portions 21 of the pedal is inserted, and the pedal accommodating space 20 is formed in the pedal stand 1 in such a manner that, when the bent portion 21 of the pedal is inserted into the hole, the pedal can swing about the line of contact where the folding line of the bent portion 21 meets the edge of the hole. Hence, it is not always necessary to provide the retaining plate 22. That is, instead of the provision of the retaining plate 22, the pedal stand 1 may be formed by pressing to have the above-described hole and pedal accommodating space 20.

In the above-described first embodiment, the speed changing pedal 2 and the signal pedals 3 are connected through the hinges 4 to the pedal stand 1. On the other hand, in the second embodiment, as is seen from FIG. 6, the speed changing pedal 2 and the signal pedals 3 can be connected to the pedal stand 1 without the hinges 4. Hence, in the case of the second embodiment, those pedals can be connected to or disconnected from the pedal stand with ease.

Third Embodiment

Figure 7:
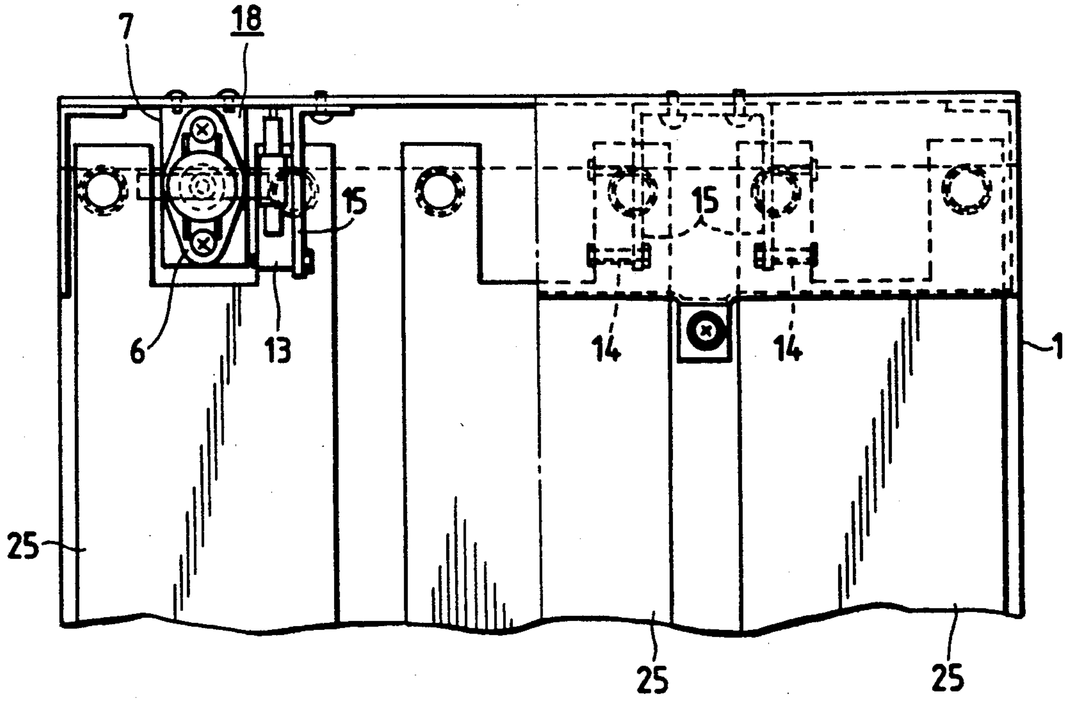
FIG. 7 is a plan view showing another example of the pedal assembly which constitutes a third embodiment of the invention.
Figure 8:
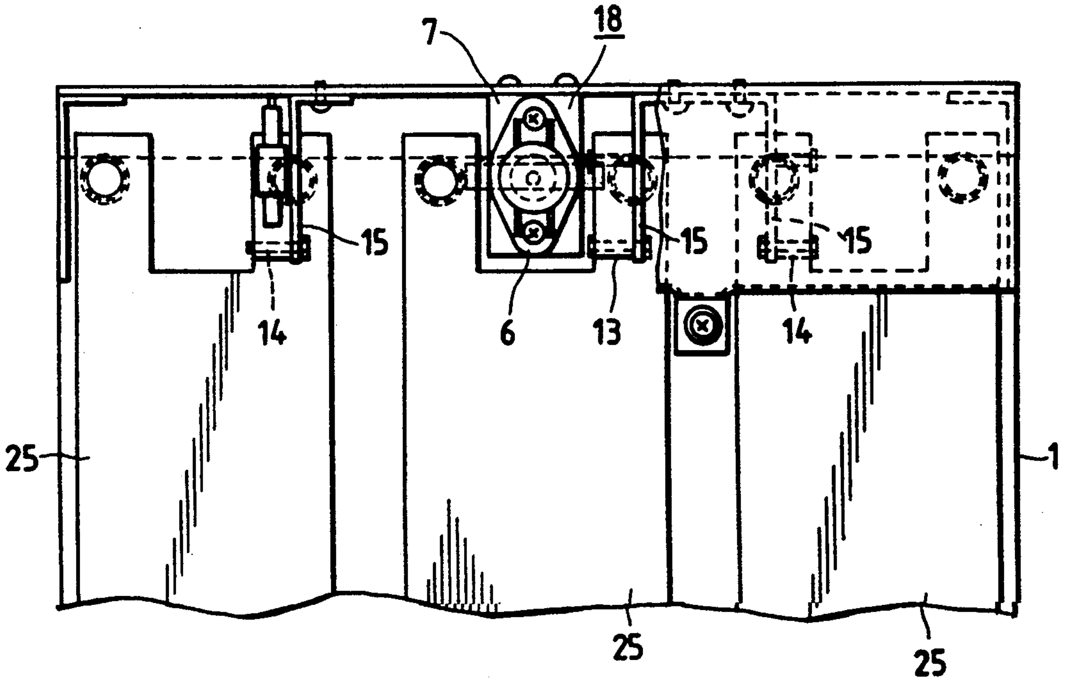
FIG. 8 is a plan view showing a speed changing signal outputting unit which has been displaced in the pedal assembly shown in FIG. 7.
Figure 9:
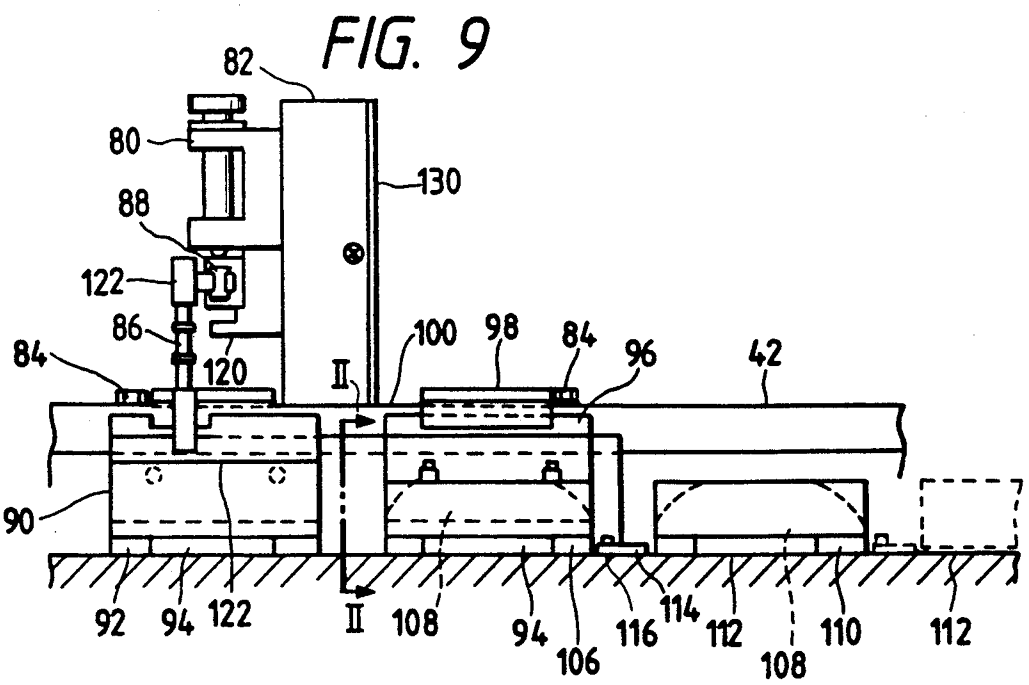
FIGS. 9 and 10 are a front view and a side view showing an example of a conventional pedal assembly in a sewing machine drive device, respectively.
Figure 10:
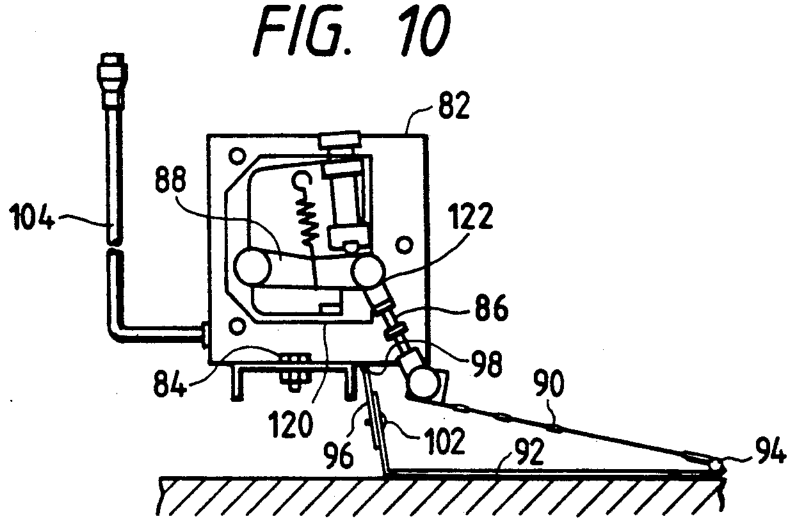
Figure 11:
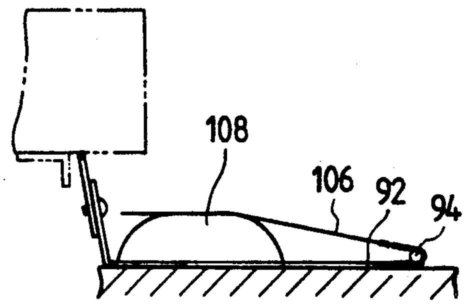
FIG. 11 is a sectional view taken along line II—II in FIG. 9.

Another example of the pedal assembly, which constitutes a third embodiment of the invention, is as shown in FIG. 8. In the third embodiment, the speed changing pedal 2 and the signal pedal can be swapped in position. In FIG. 7, reference numeral 25 designates pedals which are equal in configuration to one another. That is, in the third embodiments, all the pedals are equal in configuration. Threaded holes (or mounting stands secured means) are formed in the rising portion 1a of the pedal stand 1 in correspondence to the pedals 25 to secure the mounting stand 7 of a speed changing signal outputting unit 8, so that the mounting stand 7, and accordingly the speed changing signal outputting unit 18 can be moved to a desired position. That is, the speed changing pedal and any one of the signal pedals can be swapped in position, as shown, for instance, in FIG. 8.

The materials of the guide 8 and the horizontal rod 10 have not been specified; however, it goes without saying that they may be made by using slidable materials such as brass and stainless in combination, or they may be slidable resin.

As was described above, in the pedal assembly of the invention, the direct acting type potentiometer is fixedly mounted on the mounting stand secured to the pedal stand, and the guide is accommodated in the mounting stand, so that the direct acting type potentiometer is operated through the guide in correspondence to the amount of movement of the speed changing pedal. Hence, the pedal assembly can be installed below the sewing machine table merely by setting it on the floor; that is, the pedal assembly can be installed with ease. In addition, the pedal assembly is simple in construction, small in size, and small in the number of components, and accordingly low in manufacturing cost.

In one example of the pedal assembly of the invention, the pedals can be connected to the pedal stand merely by inserting their bent portions into the holes and pedal accommodating spaces formed in the pedal stand. Hence, the pedals can be connected to or disconnected from the pedal stand with ease. Accordingly, the pedal assembly is simple in maintenance, and can be formed at low manufacturing cost.

In another example of the pedal assembly of the invention, the mounting means for securing the speed changing signal outputting is provided for each of the pedals, so that the speed changing signal outputting unit can be set at a desired position, or the speed changing pedal and the signal pedals can be set at desired positions. That is, the pedals can be so positioned that the operator can operate them with high efficiency.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A pedal assembly in a sewing machine drive device which comprises:

a pedal stand;

a mounting stand secured to said pedal stand;

a direct acting type potentiometer secured to said mounting stand;

a potentiometer operating member which is guided and held by said mounting stand, to control a slide shaft of said direct acting type potentiometer; and a speed changing pedal including a depressing board which depresses said potentiometer operating member positioned at one end portion of said pedal, said speed changing pedal being swingably mounted to said pedal stand with another end portion;

wherein said potentiometer is positioned above said speed changing pedal and said speed changing pedal is depressed to output a signal for changing the speed of rotation of a sewing machine in accordance with an amount of movement of said speed changing pedal.

2. A pedal assembly in a sewing machine drive device which comprises:

a pedal having one end portion which is formed into a Z-shaped bent portion; and a pedal stand on which said pedal is mounted, including a pedal mounting portion in which a hole is formed into which said bent portion of said pedal is inserted, and in which a pedal accommodating space is formed in such a manner that, when said bent portion of said pedal is inserted into said hole, said pedal can swing about the line of contact where the folding line of said bent portion of said pedal meets the edge of said hole;

wherein said pedal is connected to said pedal stand by inserting said bent portion of said pedal into said hole and pedal accommodating space of said pedal stand.

3. A pedal assembly in a sewing machine drive device which comprises:

a pedal stand;

a mounting stand secured to said pedal stand;

a direct acting type potentiometer secured to said mounting stand;

a potentiometer operating member which is guided and held by said mounting stand, to control a slide shaft of said direct acting type potentiometer;

a speed changing pedal including a depressing board which depresses said potentiometer operating member positioned at one end portion of said pedal, said speed changing pedal being swingably mounted to said pedal stand with another end portion;

at least one signal pedal swingably coupled to said pedal stand, said signal pedal being positioned in parallel alignment with said speed changing pedal; and securing means for securing said mounting stand on said pedal stand, said securing means being provided at positions of said speed changing pedal and said signal pedal, respectively, wherein said potentiometer is positioned above said speed changing pedal and said speed changing pedal is depressed to output a signal for changing the speed of rotation of a sewing machine in accordance with an amount of movement of said speed changing pedal.

4. A pedal assembly according to claim 1, said another end portion of said speed changing pedal being formed as a Z-shaped bent portion, and a pedal mounting portion on said pedal stand provided with a hole into which said bent portion of said pedal is inserted, and provided with a pedal accommodating space which is formed in such a manner that, when said bent portion of said pedal is inserted into said hole, said pedal can swing about the line of contact where the folding line of said bent portion of said pedal meets the edge of said hole.

5. A pedal assembly according to claim 1, further comprising:

at least one signal pedal swingably coupled to said pedal stand, and positioned in parallel alignment with said speed changing pedal; and securring means for securring said mounting stand on said pedal stand, said securring means being provided at positions of said speed changing pedal and signal pedals, respectively.

6. A pedal assembly according to claim 4, further comprising:

at least one signal pedal swingably coupled to said pedal stand, and positioned in parallel alignment with said speed changing pedal; and securring means for securring said mounting stand on said pedal stand, said securring means being provided at the positions of said speed changing pedal and signal pedals, respectively.

* * * * *